June 23, 1936.  E. DEUTSCH ET AL  2,045,344
AUTOMOBILE TOP AND OPERATING MEANS THEREFOR
Filed March 14, 1932  4 Sheets-Sheet 1
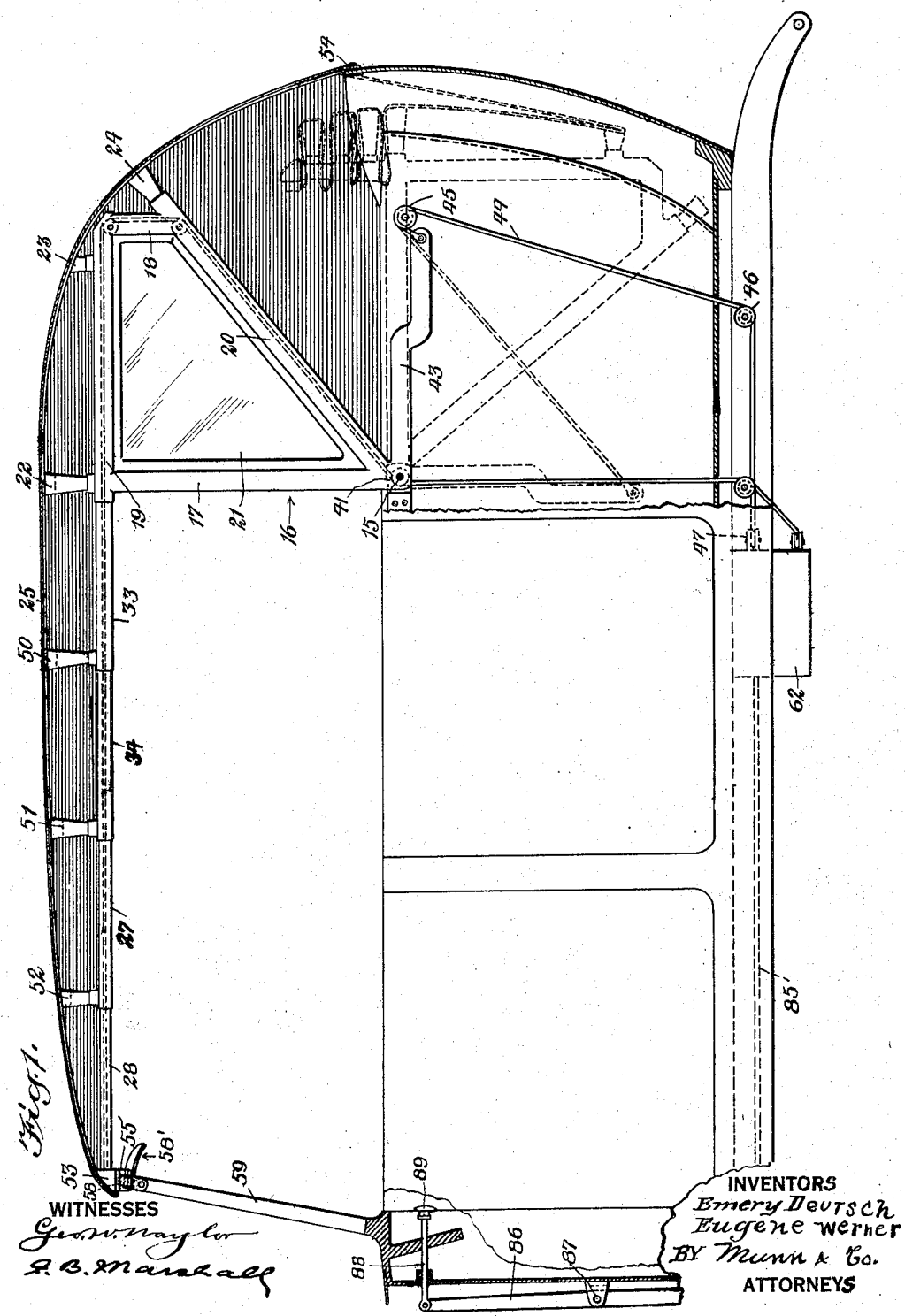
WITNESSES
INVENTORS
Emery Deutsch
Eugene Werner
BY Munn & Co.
ATTORNEYS

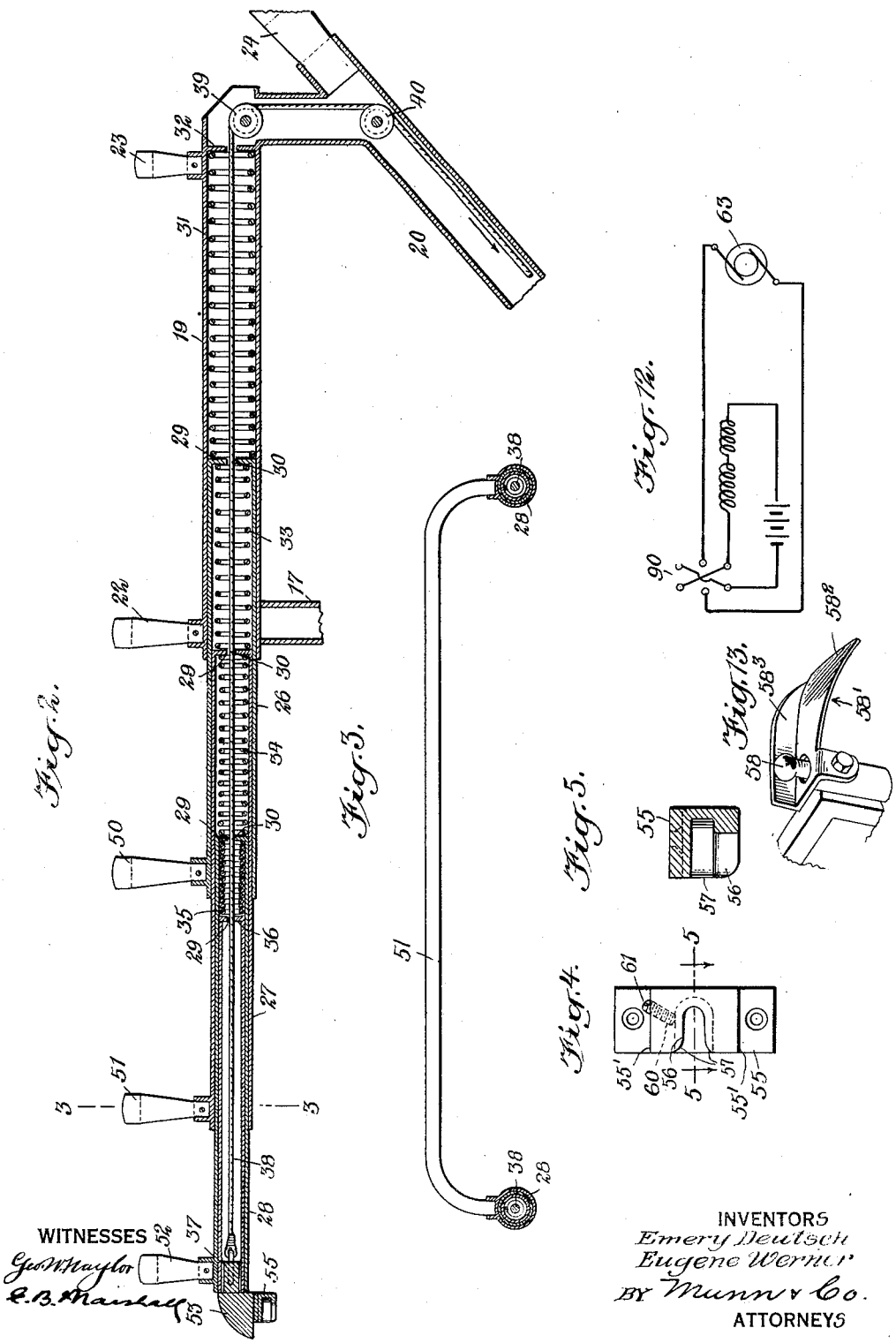

June 23, 1936.  E. DEUTSCH ET AL  2,045,344
AUTOMOBILE TOP AND OPERATING MEANS THEREFOR
Filed March 14, 1932  4 Sheets-Sheet 3

WITNESSES
Geo. N. Naylor
E. B. Marshall

INVENTORS
Emery Deutsch
Eugene Werner
BY Munn & Co.
ATTORNEYS

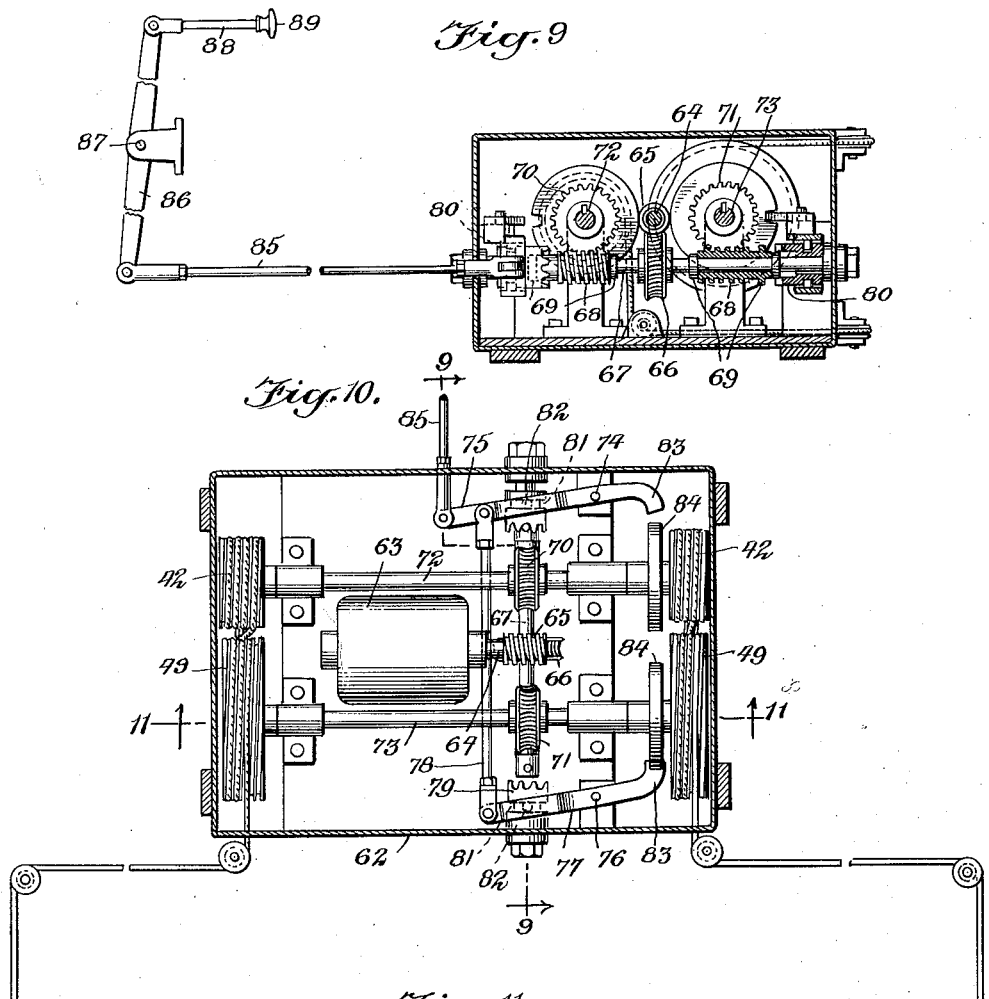

Patented June 23, 1936

2,045,344

UNITED STATES PATENT OFFICE 2,045,344

AUTOMOBILE TOP AND OPERATING MEANS THEREFOR

Emery Deutsch, Richmond Hill, and Eugene Werner, New York, N. Y., assignors, by direct and mesne assignments, of twenty-two and one-half per cent to Arnold Deutsch, Richmond Hill, N. Y., twenty-two and one-half per cent to Louis Werner, and ten per cent to Maurice Brown, both of New York, N. Y.

Application March 14, 1932, Serial No. 598,814

4 Claims. (Cl. 296—117)

An object of the invention is to provide an automobile top which may be conveniently adjusted to completely cover the body, or, if desired, to partially cover the body and thereby provide a victoria or cabriolet.

Another object of the invention is to provide an automobile top having at each side of its rear portion a rigid enclosing frame adjustable relatively to the body of the automobile, each of the rigid enclosing frames having a glass window which is protected by the enclosing frame.

Still another object of the invention is to provide the top with telescopic members which carry top member supporting bows, there being resilient means for holding the telescopic members in positions relatively to each other, and there being additional means for moving the telescopic members relatively to each other from the said positions.

A further object of the invention is to provide a top for automobiles and other vehicles having rear portions pivoted at the sides of the body, there being telescopic members which telescope with each other and with the said rear portions and there being means for moving the telescopic members relatively to each other and to the rear portions and there being additional means for moving the said rear portions on horizontal pivots which support the rear portions.

The invention also comprehends a power means under the control of the driver for operating the means for moving the telescopic members relatively to each other and also to operate the means for moving the rear portions of the top on their pivots.

Additional objects of the invention will appear in the following specification in which the preferred form of the invention is described.

Figure 6:
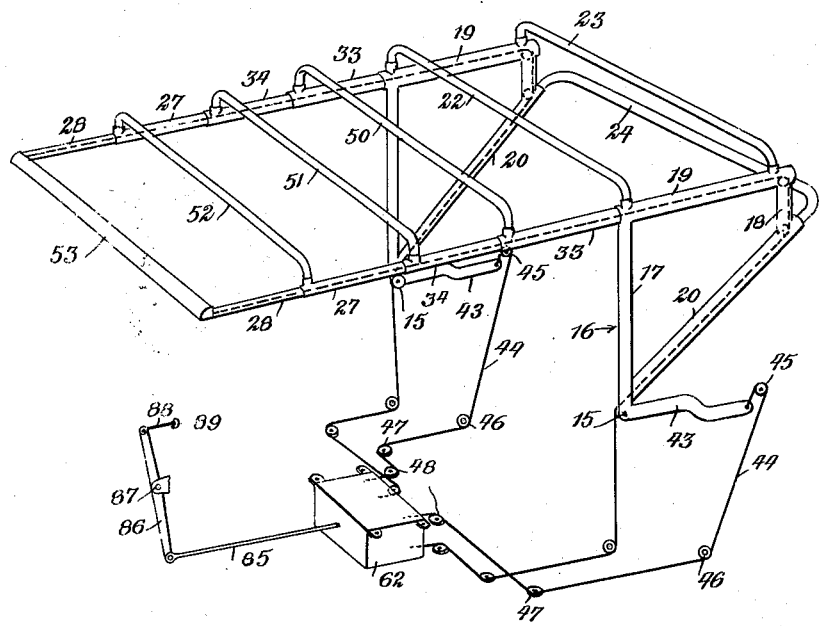
Figure 7:
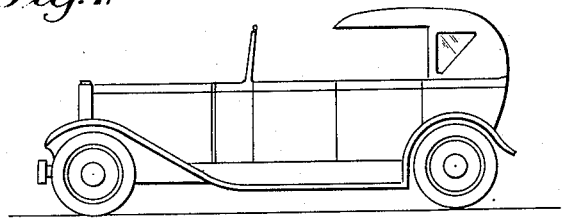
Figure 8:
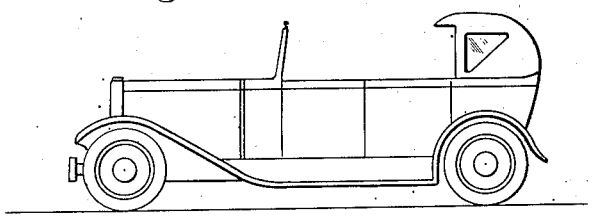

In the drawings similar reference characters refer to similar parts in all the views, of which Figure 1 is a sectional side elevation of an automobile body provided with the top which is the subject matter of this application, Figure 2 is a fragmentary sectional view illustrating the construction of the telescopic members and also the rear side members which carry the telescopic members, Figure 3 is a sectional view on the line 3—3 of Figure 2, Figure 4 is an inverted enlarged plan view showing one of the members provided for securing the top to the windshield, Figure 5 is a sectional view on the line 5—5 of Figure 4, Figure 6 is a perspective view illustrating the automobile top and showing diagrammatically the operating means therefor, Figure 7 is a view showing in side elevation an automobile provided with the improved top arranged to provide a cabriolet, Figure 8 is a similar view, but with the top arranged to provide a victoria, Figure 9 is a sectional view on the line 9—9 of Figure 10, Figure 10 is a plan view illustrating the electric motor and the means driven thereby for operating the automobile top, Figure 11 is a sectional view on the line 11—11 of Figure 10, Figure 12 is a diagrammatic view illustrating a reversing switch for the electric motor, and Figure 13 is a fragmentary perspective view illustrating one of the mountings on the windshield for engagement by the forward section of the automobile top.

By referring to the drawings it will be seen that to each side of the body of the automobile there is pivoted at 15 a side frame member 16, each of these side frame members 16 having a forward side member 17, a rear side member 18, a top member 19 and a bottom member 20, it being understood by referring to the drawings, and particularly Figures 1, 2 and 6, that the top member 19 is disposed approximately at right angles relatively to the forward side member 17 and that the rear side member 18 is disposed approximately parallel with the forward side member 17 but does not extend down as far as the said forward side member 17. Therefore, the bottom member 20 is disposed obliquely upwardly. As has been stated, one of these side frame members 16 is pivoted at each side of the automobile body and the top member 19 of each of the side frame members is tubular. The rear side member 18 is tubular, as is also the bottom member 20. Preferably the forward side member 17 is likewise tubular. The members 17, 18, 19 and 20 of each of the side frame members 16 provide a rigid enclosing frame for protecting a glass window 21 which, as shown in Figure 1, is mounted within each of the said side frames 16, the glass window 21 being protected by the members of the side frames which enclose the glass windows 21.

As will best be seen by referring to Figure 6 of the drawings, there are two bows 22 and 23 which connect the tops of the side frames 16, there being also an additional bow 24 which connects the rear of the said side frames. The top members 19 of the side frames 16, together with their bows 22 and 23, cooperate with members which telescope with each other and also with the top members 19 of the side frames 16 to support the usual flexible top 25 of an automobile. As shown in Figure 2, a telescopic member 26 is disposed in each of the tubular top members 19 of the side frames 16, a telescopic member 27 is disposed in each of the telescopic members 26 and a telescopic member 28 is disposed in each of the telescopic members 27. Each of the telescopic members 26, 27 and 28 has at its rear a head 29 provided with an aperture 30, a spring 31 being disposed between a head 32 at the rear of each of the top members 19 and the head at the rear of each of the telescopic members 26, a spring 33 being disposed between the rear of the head 29 on each of the telescopic members 27 and the heads 29 on the telescopic members 26, a spring 34 being disposed between the head 29 on each of the telescopic members 27 and the head 29 on each of the telescopic members 28, a spring 35 being disposed between the head 29 on each of the telescopic members 28 and a head 36 having an aperture on each of the front members 37 of the top. A cord 38 is disposed in the telescopic members at each side of the top and this cord 38 is secured to the front member 37, as illustrated in Figure 2. Each cord at the rear passes around a pulley 39 and then downwardly in one of the rear side members 18, then around another pulley 40 and then forwardly and around a pulley 41 to one of the drums 42. It will be understood that each of the two cords or cables 38 will be mounted in the manner described and that each cord or cable 38 will pass to one of the two drums 42, as shown in Figure 10.

As shown in the drawings, each of the side frames 16 has an arm 43 extending rearwardly from its pivot 15, a cord or cable 44 being secured to the rear of each of these arms 43, the cord or cable 44 passing upwardly and around a pulley 45 secured to a side of the body, then downwardly and around a pulley 46, then forwardly and around pulleys 47, and then inwardly and around a pulley 48 to the drums 49, as illustrated in Figure 10, there being two of these drums 49 on each of which one of the cords or cables 44 is adapted to be wound.

As has been stated, there are two bows 22 and 23 which connect the top members 19 of the side frame 16. There is a bow 50 connecting the telescopic members 26, there is a bow 51 connecting the telescopic members 27, and there is a bow 52 connecting the telescopic members 28. The top member 25 is secured to the peak member 53 secured to the front member 37 and the telescopic member 28, the top member being also secured to the bows 50, 51, 52, 22 and 23. This top member also passes around the bow 24, but it is not secured to the bow 24, the top member then extending downwardly at its sides and rear to the body where it is secured at 54. Secured to the underside of the peak 53 there are top securing members 55, each of these top securing members 55 having a slot 56 which is open in front and at its bottom and which has undercut grooves 57 for receiving the knobs 58 at the top of the windshield 59. The top securing members 55 are provided with threaded apertures 60 in which screws 61 thread, the screws 61 being provided for engaging and locking the knobs 58, illustrated in Figure 13, which will hold the top secured relatively to the windshield. There are guide members 58' at the knobs 58 which guide the top securing members 55, each of the guide members 58' having a portion $58^2$ which is curved rearwardly and downwardly for engaging a top securing member 55 between its shoulders 55' and each of the guide members 58' also having a vertically extending fin $58^3$ which may be disposed at the inner side of the portion $58^2$ and be curved rearwardly and inwardly to engage a shoulder 55' on the top securing member 55. The upper edge of the fin $58^3$ is also curved rearwardly and downwardly. It will, therefore, be seen that as the top is moved forwardly under the influence of the springs 31, 33, 34 and 35, the two top securing members 55 on the peak 53 will be directed by the portions $58^2$ and the fins $58^3$ of the guide members to position their slots 56 for receiving the knobs 58.

With the automobile top positioned as illustrated in Figure 1 of the drawings, it is possible to free the screws 61 and subsequently free the peak from the windshield, after which the cords 20 or cables 38 may be drawn in a manner, which will shortly be described, to bring the telescopic members rearwardly relatively to each other to position the top, as may be desired, spaced from the windshield 59, as illustrated in Figures 7 and 8, or in any other desired position. Should it be desired to lower the top completely, the cords or cables 38 are drawn to nest the telescopic members within the top members 19 of the side frames 16, after which the cords or cables 44 are gradually freed to permit the rearward and downward rotation of the side frame 16 to the position shown by the dotted lines in Figure 1.

By referring to Figure 10 of the drawings, it will be seen that a motor frame 62 is provided which may be disposed in any desired position on the automobile chassis or the automobile body, this motor frame 62 serving to support a motor 63, the motor 63 having a shaft 64 with a worm 65, the worm 65 meshing with a worm wheel 66 secured to a transverse shaft 67. Rotatably mounted on the shaft 67 there are worms 68 which are held in position on the shaft 67 by means of collars 69. These worms 68 mesh with worm wheels 70 and 71 secured to shafts 72 and 73 respectively. Pivoted at 74 at one side of the frame 62 there is a lever 75 and pivoted at 76 at the other side of the frame 62 there is a lever 77, these levers 75 and 77 being connected by a link 78. There are two clutch members 79 which are disposed one at each side of the frame 62 and on the shaft 67, the clutch members 79 being keyed to the shaft to rotate therewith and being adapted to operatively engage the clutch fingers 80 on the worms 68. Each of the clutch members 79 has an annular groove 81 in which a pin 82 on one of the levers 75 or 77 is disposed, so that the levers 75 and 77 serve to move the clutch members 79 into and out of engagement with the fingers 80 on the worms 68, it being understood that, when one of the clutch members 79 engages the fingers 80 at one side of the frame 62, the other clutch member 79 will be out of engagement with its companion fingers 80. It will also be seen that each of the levers 75 and 77 has a brake shoe 83 for engaging a brake disc 84, one of these brake discs 84 being mounted on the shaft 72 and the other brake disc 84 being mounted on the shaft 73. It will also be seen that the two drums 42 are mounted at opposite ends of the shaft 72 and that the two drums 49 are mounted on the opposite ends of the shaft 73.

The lever 75 is connected by a link 85 with an arm of a lever 86, which, as shown in the drawings, may be pivoted at 87 in the front of the instrument board of the automobile. To one arm of this lever 86 there is articulated a link 88, the link passing rearwardly to a position where it may be conveniently reached by the driver of the automobile and having a head 89 by which it may be pushed inwardly and outwardly to move one of the levers 75 and 77 to a position where one of the clutch members 79 will engage the fingers 80 to lock one of the worms 68 for rotating with the shaft 67. The other lever will be moved, so that its brake shoe 83 will engage the brake disc 84 so that, while one of the shafts 72 or 73 will be rotated by the means which have been described, the other of the shafts 72 or 73 will be locked against rotation. It will be seen that, with this construction, either of the shafts 72 or 73 may be driven, and that, when one of the shafts is driven, the other shaft will be locked to prevent its rotation.

As will be seen by referring to Figure 12 of the drawings, any desired switching means may be provided for starting and stopping the motor 63 and that this switching means should be arranged to permit of the reversal of the motor, as suggested in Figure 12.

The switch 90, as well as the knob 89 on the link 88, may be positioned within convenient reach of the driver of the automobile, so that when desired the driver may free the screws 61 from the knobs 58 and, by means of the knob 89, adjust the levers 75 and 77 so that the drums 42 will be rotated to draw on the cords or cables 38 to telescope the members 26, 27 and 28 within the top members 19 of the side frame members 16, to dispose the top of the automobile to serve the convenience of the occupants.

When it is desired to lower the top entirely, it will be understood that the telescopic members will all be withdrawn within the tubular top members 19 by drawing on the cord or cable 38 at the drums 42. When this has been done, the current to the motor may be shut off at the switch 90, after which the knob 89 may be adjusted to connect the motor 63 with the drums 49 and the motor may be operated in the same direction by means of the switch 90, when the drums 49 through the motor 63 will slowly feed the cords or cables 44, permitting the side frame members 16 to rotate rearwardly and downwardly on their pivots 15 by means of gravity so that they will be housed in a recess 100 in the body, as illustrated by the dotted lines in Figure 1.

It will be understood, of course, that, when the top is to be raised, the motor will be reversed and the drums 49 will then draw on the cords or cables 44 to raise the side frame members to the positions illustrated in Figures 1 and 6, when the telescopic members may be moved forwardly under the influence of the springs by feeding the cords or cables 38 at the drums 42 by manipulating the switch 90 to still maintain the motor in reverse operation so that the drums 42 will also be reversely revolved as were the drums 49 during the raising of the side frames. The top may be applied to any type of vehicle body in which a collapsible top is used to provide a complete open or a partially open type of vehicle body.

What is claimed is:

1. In combination with a body, two rigid side frames pivoted one to each side of the body and forming enclosing frames for rear quarter windows, telescopic members which telescope with each other and with the side frames, bows secured to the telescopic members and to the side frames, means for moving the telescopic members relatively to each other and to the side frames, and means for moving the side frames on their pivots.

2. In combination with a body, two side frames each with tubular parts, the side frames being pivoted one at each side of the body, tubular telescopic members which telescope with each other and with the tubular parts of the side frames, cords secured to certain of the tubular members and disposed in the tubular members and in the tubular parts of the side frames for moving the members relatively to each other and to the side frames, other cords secured to the side frames for rocking the side frames on their pivots, and selective power means for operating either set of cords at will.

3. In combination with a body, two rigid side frames pivoted one to each side of the body and forming holders for rear quarter windows, telescopic members which telescope within each other and within the side frames, top supporting bows secured to the telescopic members and to the side frames, means for moving the telescopic members relatively to each other and to the side frames, and means for moving the side frames relatively to the pivot.

4. A collapsible top for vehicle bodies of the cabriolet or convertible coupe type including, a main top supporting bow having its ends pivotally connected to the body for folding, a rear quarter window including a rigid frame secured to the rear vertical face of said main top supporting bow and movable rearwardly and downwardly therewith when the top is collapsed, a flexible top covering material extending rearwardly from the main top supporting bow and rearwardly from the window frame to the deck of the vehicle to close the space therebetween and secured to said window frame, and a recess in the body to the rear of said main bow into which said window is moved when said top is collapsed.

EMERY DEUTSCH.
EUGENE WERNER.